Patented Sept. 6, 1927.

1,641,761

UNITED STATES PATENT OFFICE.

WALTER C. IBELE, OF EUCLID VILLAGE, OHIO, ASSIGNOR TO GENERAL ELECTRIC COMPANY, A CORPORATION OF NEW YORK.

CEMENT FOR INCANDESCENT-LAMP FILAMENTS.

No Drawing.     Application filed September 20, 1922. Serial No. 589,468.

My invention relates to cements or pastes for use in uniting the ends of the filament of an electric incandescent lamp to the ends of the leading-in conductors, which are ordinarily of metal, and more particularly relates to pastes or cements of this character suitable for use with carbon filaments. The object of my invention is to provide a paste or cement which will produce a very secure joint and which will be easily applied. Another object of my invention is to produce a cement which when dry, will be substantially free from volatile constituents so that phosphorus or other material which it is desired to introduce into the lamp may be combined therewith, and the so-called dark method of exhausting the lamp may be followed. In the cements heretofore used the volatile constituents have been present to such an extent that it has been necessary to heat the joint in order to drive them off. The consequence was that the phosphorus could not be combined with the cement and had to be applied in some other way. Moreover, the dark exhaust method could not be followed.

According to my invention, very finely divided graphite in liquid suspension is utilized as the cement. So-called "aquadag", which is well-known and is procurable in the market, is desirable for this purpose. "Aquadag" is a deflocculated graphite in suspension in water with a certain small percentage of deflocculating agents such as ammonia and tannic acid.

One formula for this paste which has been used with good results is made as follows: A supply of 20% "aquadag" is diluted with distilled water with thorough mixing. The mixture is tested after each addition of water by means of a Majonnier viscosimeter until a viscosity of 340 is obtained at room temperature. 700 grams of this mixture is then taken and there is added to it 240 grams of No. 1340 Acheson dry graphite and 160 grams of 35% "aquadag". The mixture is stirred until homogenous, and then 10 grams of dry red phosphorus powder are added. The product thus obtained is a thick slush and, from time to time, it can be thinned to bring it to convenient working condition. The purpose of adding the dry graphite and 35% "aquadag" is to concentrate the mixture so that it will dry quickly. The inclusion of the red phosphorus is a convenient method of introducing into the incandescent lamp where it is useful for completing the vacuum.

What I claim as new and desire to secure by Letters Patent of the United States, is,—

1. A preparation for uniting a carbon incandescent lamp filament to a leading-in wire consisting of finely divided graphite and red phosphorus suspended in a liquid.

2. A preparation for uniting a carbon incandescent lamp filament to a leading-in wire consisting of deflocculated graphite and red phosphorus suspended in a liquid.

3. A preparation for uniting a carbon incandescent lamp filament to a leading-in wire consisting of deflocculated graphite and red phosphorus suspended in a liquid consisting principally of water.

4. A preparation for uniting an incandescent lamp filament to a leading-in wire consisting of finely divided graphite and a volatile chemical which combines with oxygen.

5. A preparation for uniting an incandescent lamp filament to a leading-in wire consisting of deflocculated graphite and a volatile chemical which combines with oxygen.

In witness whereof I have hereunto set my hand this 18 day of September, 1922.

WALTER C. IBELE.